(12) United States Patent
Taguchi

(10) Patent No.: US 10,578,218 B2
(45) Date of Patent: Mar. 3, 2020

(54) VACUUM VALVE

(71) Applicant: SHIMADZU CORPORATION, Kyoto (JP)

(72) Inventor: Tatsuhiro Taguchi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 243 days.

(21) Appl. No.: 15/863,914

(22) Filed: Jan. 6, 2018

(65) Prior Publication Data

US 2018/0195624 A1 Jul. 12, 2018

(30) Foreign Application Priority Data

Jan. 12, 2017 (JP) ................................. 2017-003442

(51) Int. Cl.
*F16K 3/20* (2006.01)
*F16K 3/02* (2006.01)
*F16K 3/06* (2006.01)
*F16K 3/10* (2006.01)
*F16K 51/02* (2006.01)

(52) U.S. Cl.
CPC ............ *F16K 3/207* (2013.01); *F16K 3/0281* (2013.01); *F16K 3/06* (2013.01); *F16K 3/10* (2013.01); *F16K 51/02* (2013.01)

(58) Field of Classification Search
CPC . F16K 3/207; F16K 51/02; F16K 3/06; F16K 3/10; F16K 3/0281
See application file for complete search history.

(56) References Cited

U.S. PATENT DOCUMENTS 5,577,707 A 11/1996 Brida

OTHER PUBLICATIONS

Chinese Office Action for corresponding App. No. 2018100234290, dated Feb. 27, 2019 (with translation).

*Primary Examiner* — Marina A Tietjen
(74) *Attorney, Agent, or Firm* — Renner, Otto, Boisselle & Sklar, LLP

(57) ABSTRACT

A vacuum valve comprises: a housing configured such that a flow path of gas passing through a pair of opposing openings is formed; a valve body; a sealing body; a sealing body drive section configured to drive the sealing body in upstream and downstream directions of the gas; and a mechanical stopper including a restriction section configured to inhibit, at a restriction position, movement of the sealing body in the gas downstream direction. The mechanical stopper is disposed movable to a selected one of a first position at which movement of the sealing body toward a gas downstream side is inhibited at the restriction position or a second position at which movement of the sealing body from the restriction position to a non-restriction position on the gas downstream side is allowed.

7 Claims, 13 Drawing Sheets

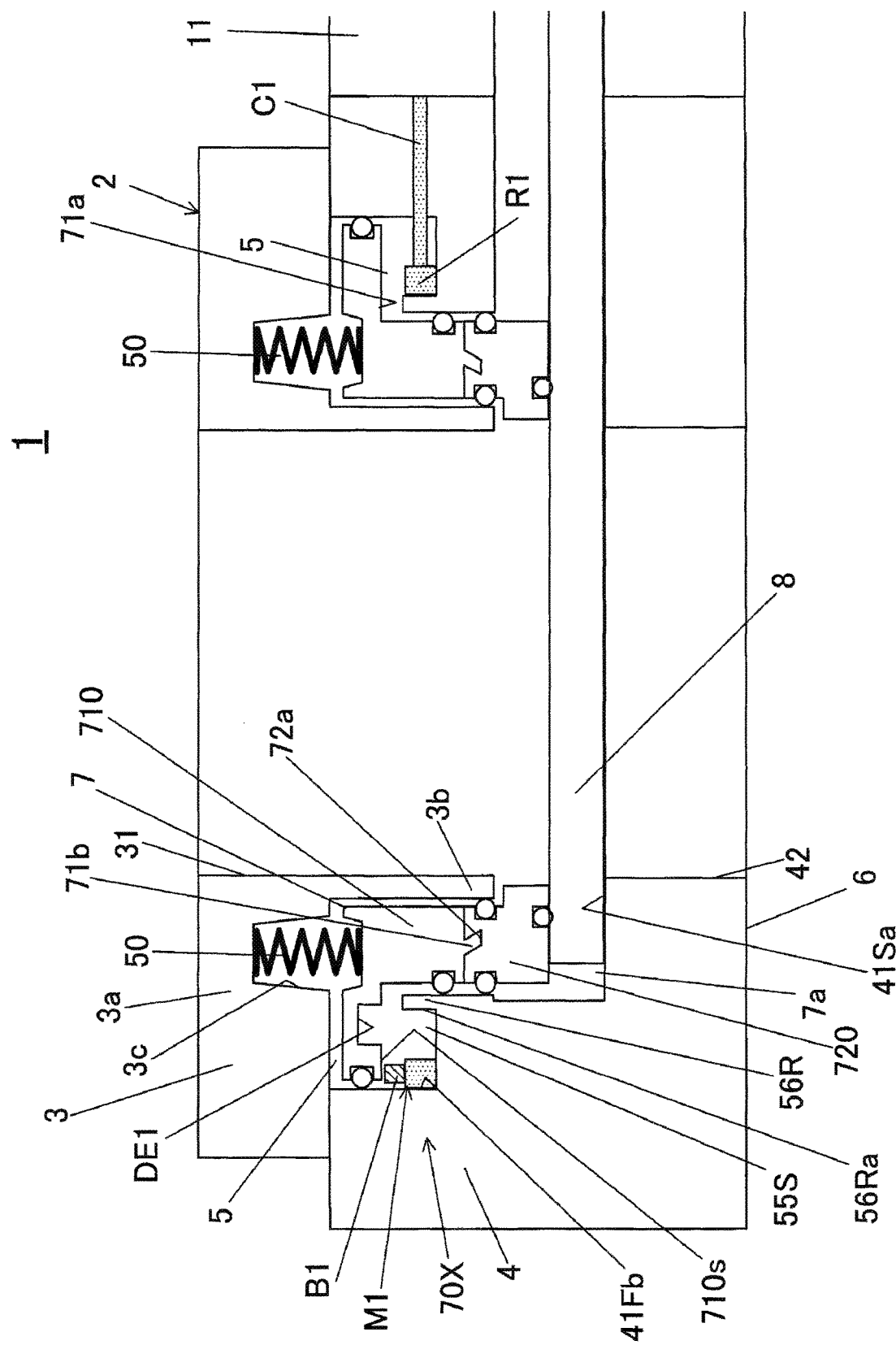

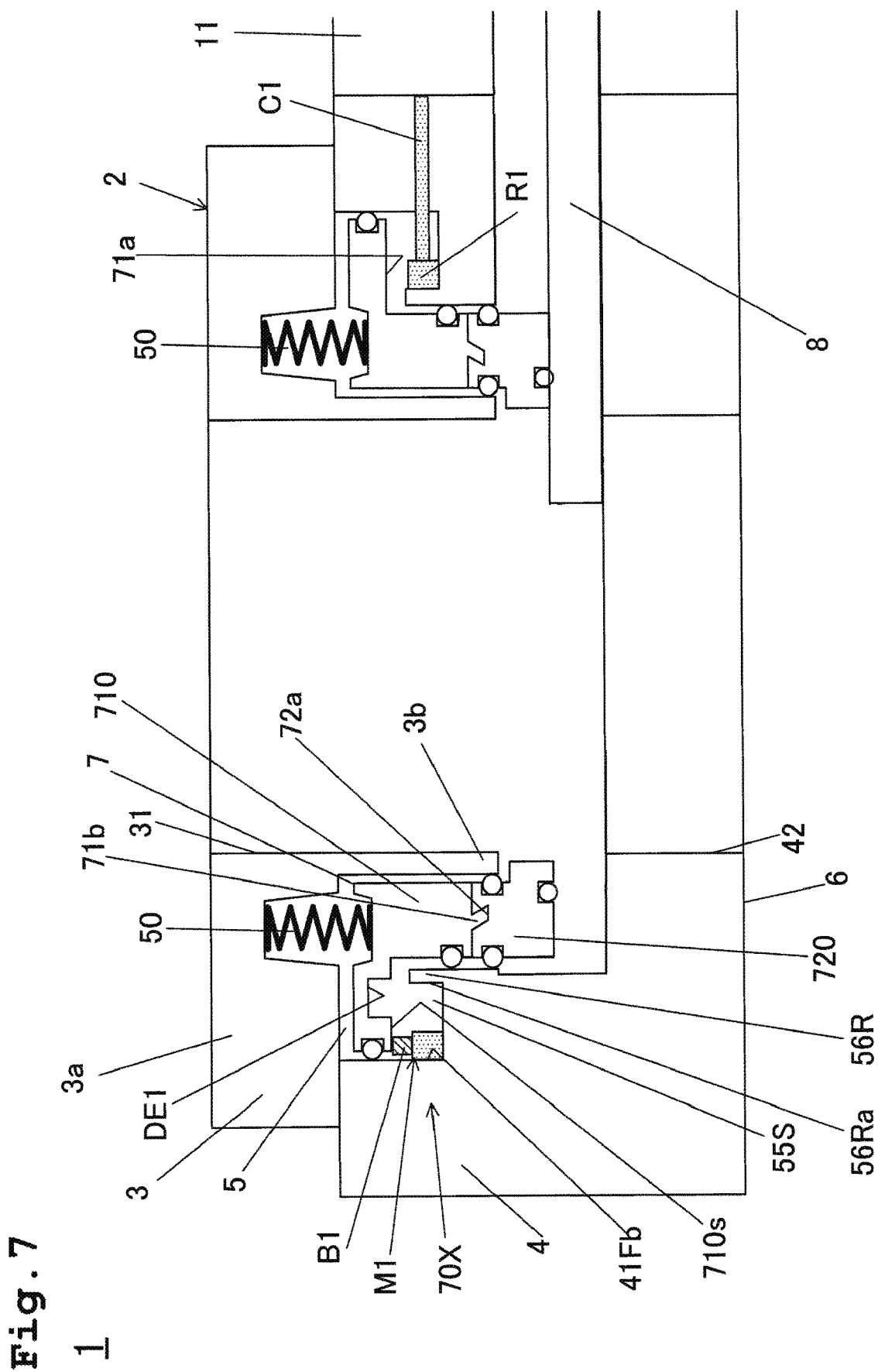

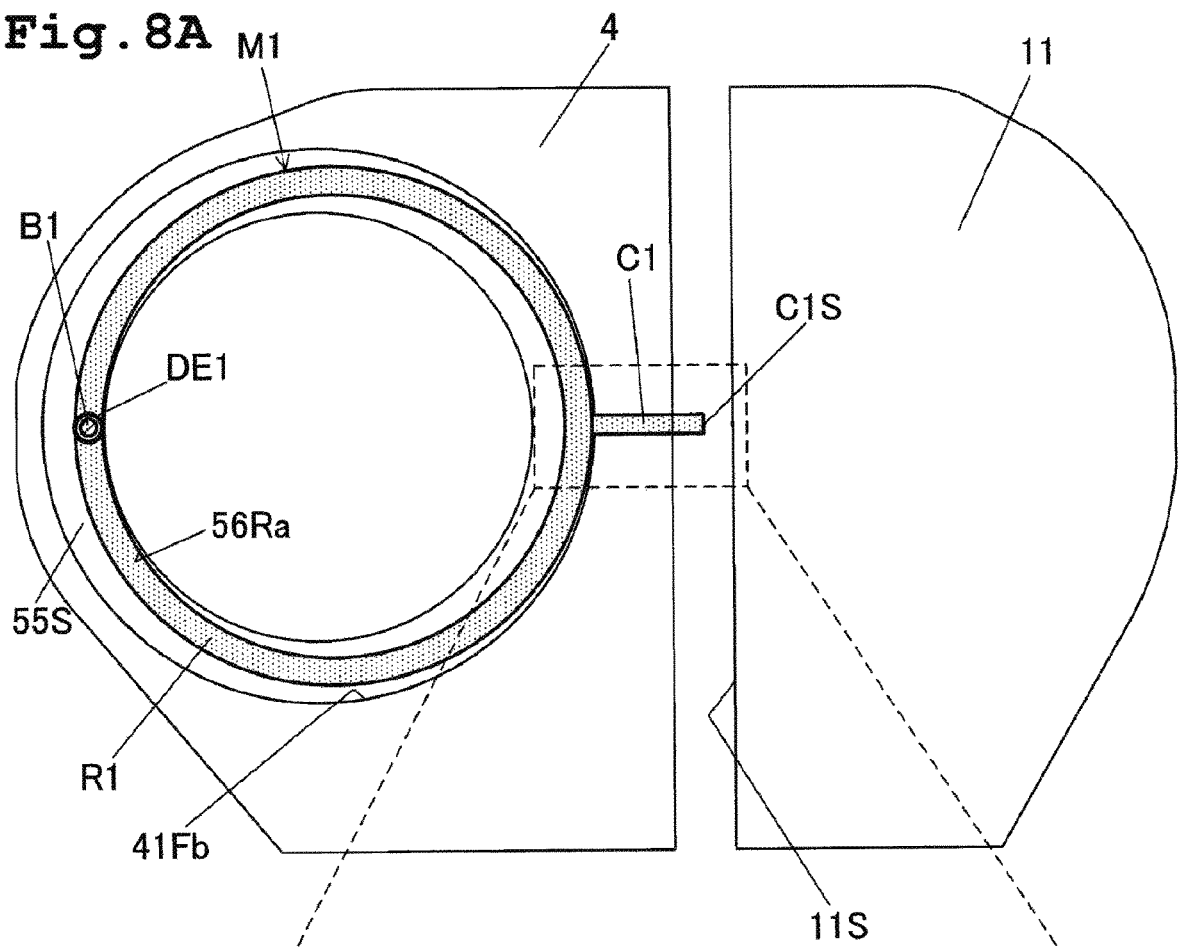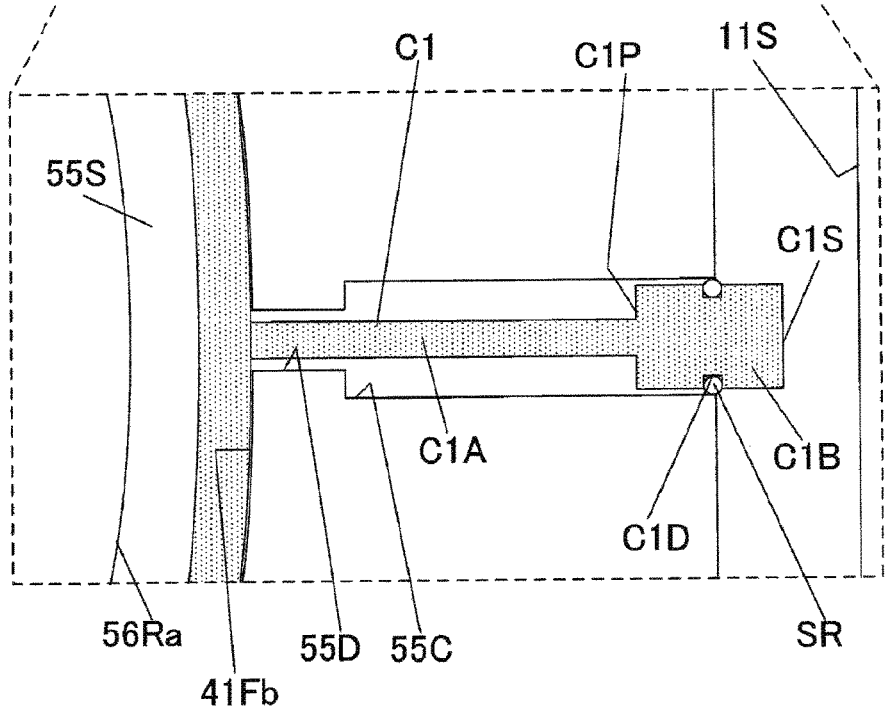

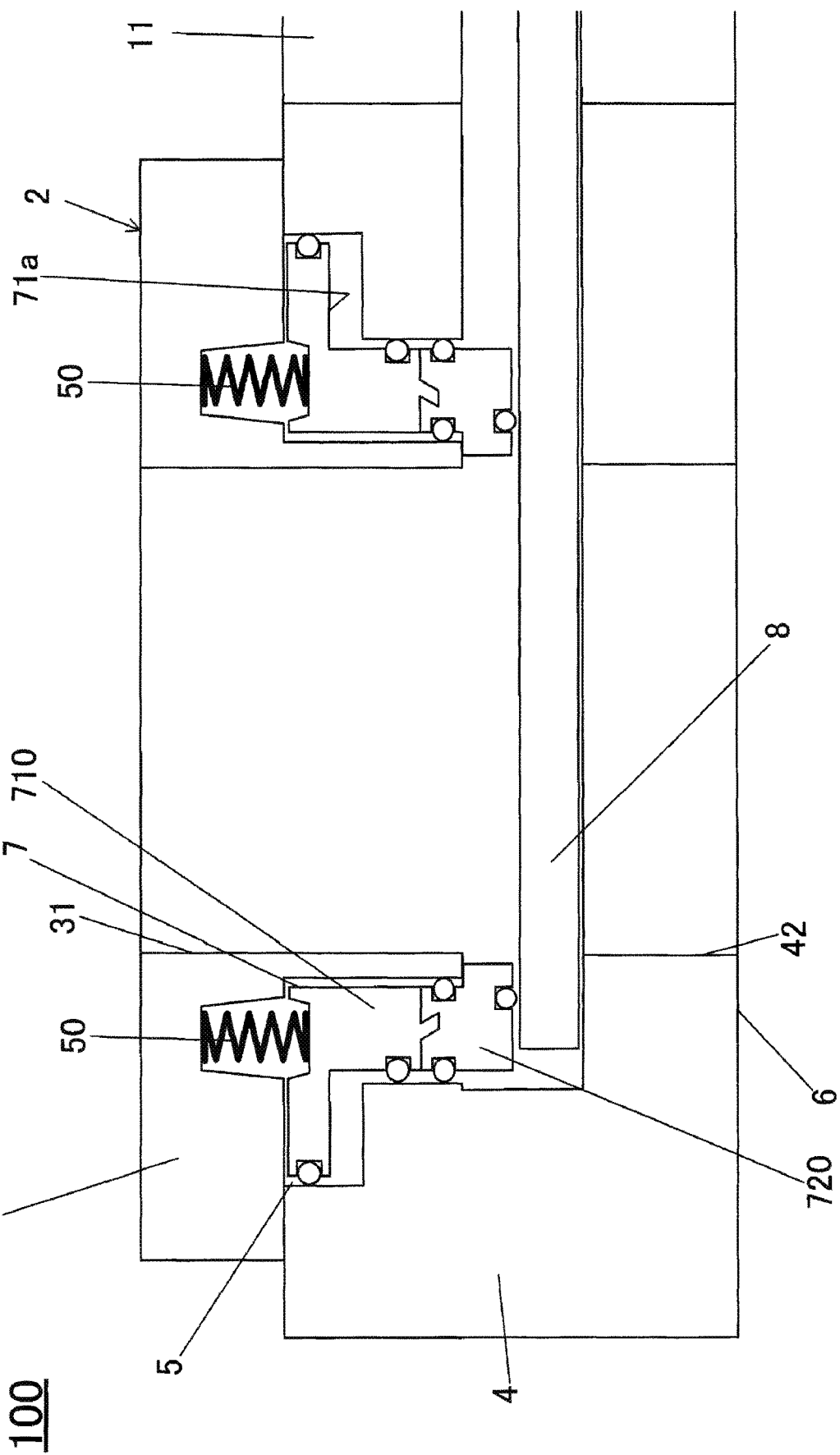

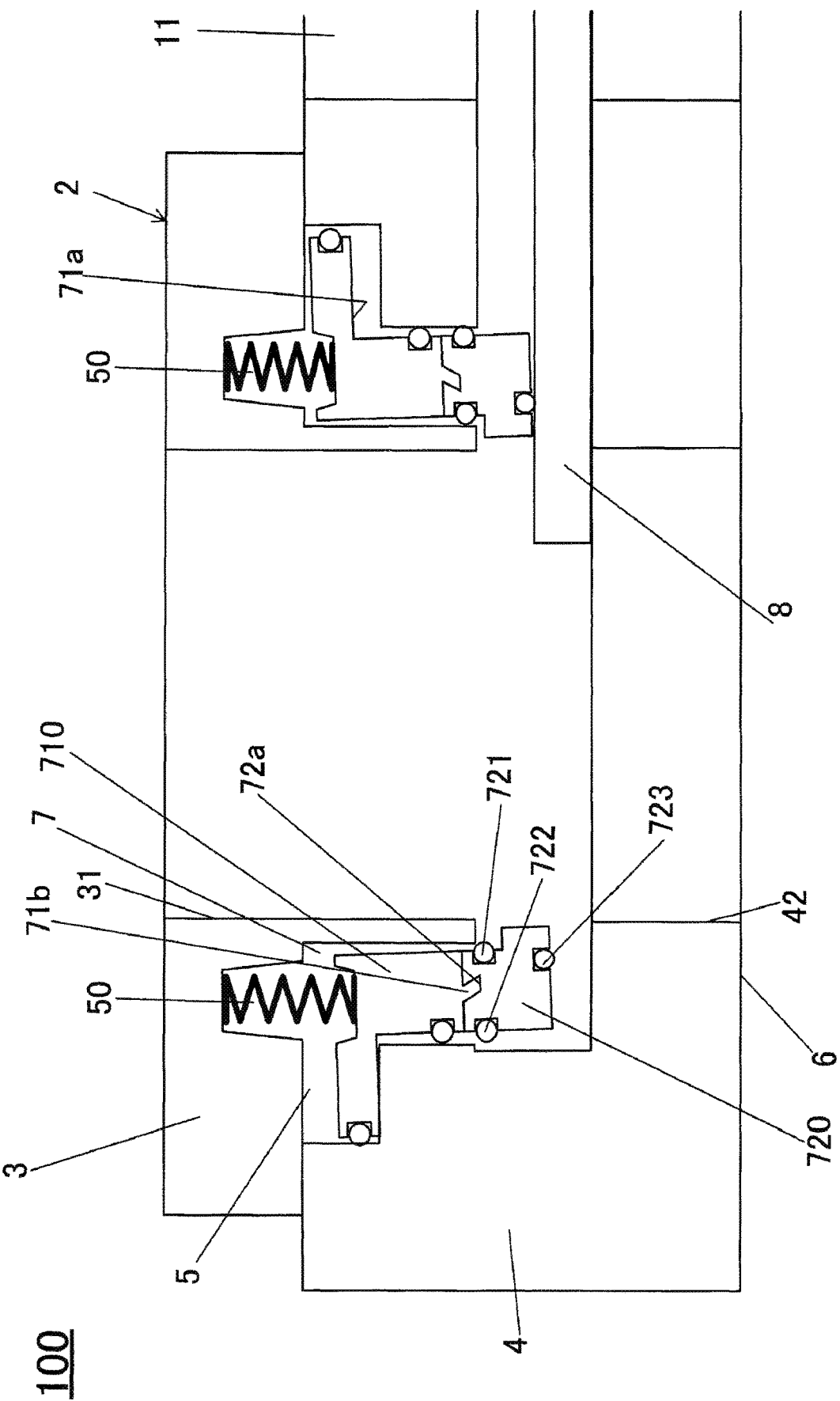

> US 10,578,218 B2

VACUUM VALVE

TECHNICAL FIELD

The present invention relates to a vacuum valve.

BACKGROUND ART

Typically in a case where a vacuum pump such as a turbo-molecular pump is attached to a vacuum chamber of a vacuum processing device, a vacuum valve is interposed. Patent Literature 1 (U.S. Pat. No. 5,577,707) discloses such a vacuum valve.

The vacuum valve described in Patent Literature 1 includes a valve housing configured such that a pair of openings is formed at opposing surfaces and a gas flow path is provided at a center portion, and a valve body detachably inserted into the opening by swinging between the openings. The vacuum valve further includes, in the valve housing, an annular sealing body surrounding the openings. The sealing body contacts a peripheral edge of the valve body driven to a fully-closed position, thereby pressing the valve body against the valve housing. In this manner, the gas flow path is blocked by the valve body.

The sealing body described in Patent Literature 1 uses a compression spring as the drive force of pressing the valve body toward the valve housing, and uses compressed air (air pressure) as drive force against the drive force of the compression spring. For example, for a reason of the air pressure being supplied by a compressor driven by power of an external power source, the drive force against the compression spring sometimes cannot be obtained by the air pressure upon blackout.

In the vacuum valve described in Patent Literature 1, when blackout occurs in a state in which the sealing body is controlled to a proper position by the drive force of the compressed air, if the valve body is not at the fully-closed position, the sealing body might be driven to a undesired position, leading to a tilting posture of the sealing body with respect to the openings, for example.

SUMMARY OF THE INVENTION

A vacuum valve comprises: a housing configured such that a flow path of gas passing through a pair of opposing openings is formed; a valve body detachably inserted into the flow path to control an opening area of the flow path; a sealing body configured to movably push the valve body when the flow path is blocked by the valve body; a sealing body drive section configured to drive the sealing body in upstream and downstream directions of the gas; and a mechanical stopper including a restriction section configured to inhibit, at a restriction position, movement of the sealing body in the gas downstream direction. The mechanical stopper is disposed movable to a selected one of a first position at which movement of the sealing body toward a gas downstream side is inhibited at the restriction position or a second position at which movement of the sealing body from the restriction position to a non-restriction position on the gas downstream side is allowed.

The sealing body includes a seal ring contacting the valve body, and a main body to which the seal ring is attached, and the non-restriction position of the sealing body is a position at which the seal ring is detachable from the main body.

The housing includes a housing base portion provided with the pair of openings, and a bonnet detachably provided at the housing base portion, and a stopper operation mechanism configured to move, in association with attachment/detachment of the bonnet, the mechanical stopper between the first position and the second position is further provided.

The stopper operation mechanism is pushed by the bonnet to move the mechanical stopper to the first position when the bonnet is attached to the housing, and uses pressure of compressed air to move the mechanical stopper to the second position when the bonnet is detached from the housing.

The sealing body drive section further includes a compression spring configured to bias the sealing body in the gas downstream direction, and a pressure receiving portion configured to push back the sealing body in the gas upstream direction against biasing force of the compression spring by the pressure of the compressed air, and a passage is provided, the passage allowing communication between an air pressure introduction chamber in which the compressed air acts on the stopper operation mechanism and an air pressure introduction chamber in which the compressed air acts on the pressure receiving portion.

The sealing body and the mechanical stopper are annular bodies surrounding the flow path, the sealing body includes a cylindrical portion surrounding the flow path, and an annular flange portion extending in an outer circumferential direction on one end side of the cylindrical portion, the flange portion forms the pressure receiving portion, and the restriction section of the mechanical stopper is provided on an opposite side of the stopper operation mechanism, and contacts the pressure receiving portion to restrict the sealing body at the restriction position.

The mechanical stopper is provided to move in a plane perpendicular to the flow path.

The present invention can prevent a sealing body from moving to an undesired position in a valve body fully-opened state or in a case where a valve body is not at a fully-closed position while vacuum chamber pressure control is being performed. For example, a tilting posture with respect to openings can be prevented.

BRIEF DESCRIPTION OF THE DRAWINGS

FIG. 4 is a sectional view along the A-A line of FIG. 2 for describing the internal structure of the vacuum valve when the sealing body 7 is at a "flow path fully-closed position;"

FIG. 7 is a sectional view along the A-A line of FIG. 2 for describing the internal structure of the vacuum valve when the sealing body 7 is at an "emergency position;"

FIGS. 8A and 8B are views of the position of the mechanical stopper upon seal ring replacement (in a maintenance state);

FIG. 10 is a sectional view of a vacuum valve of a comparative example corresponding to FIGS. 3A and 3B, the sealing body 7 being at the "flow path open position;"

FIG. 11 is a sectional view of the vacuum valve of the comparative example corresponding to FIG. 7, the sealing body 7 being at the "emergency position;"

DETAILED DESCRIPTION OF THE EXEMPLARY EMBODIMENTS

Embodiment

Figure 1:
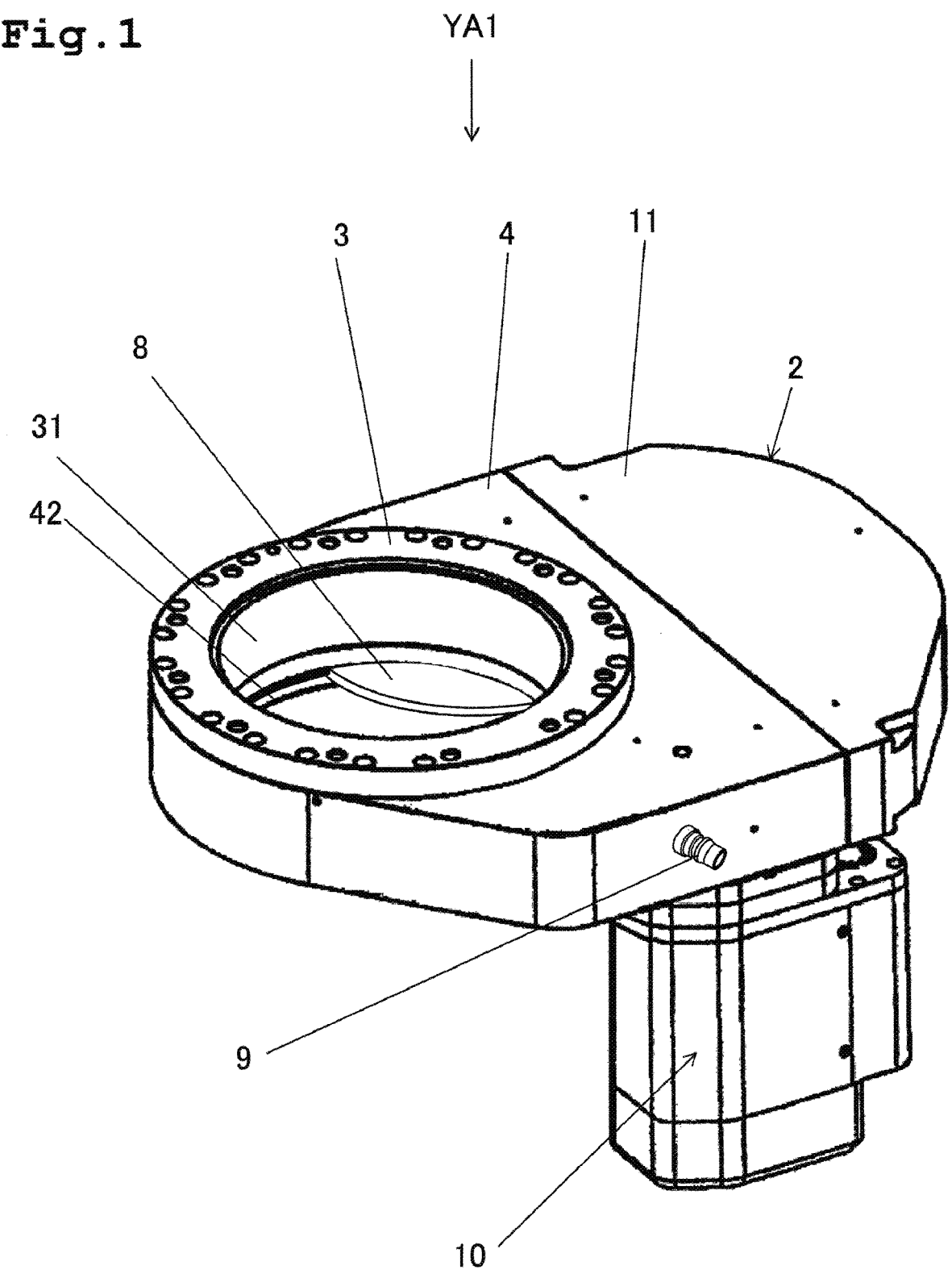
FIG. 1 is a perspective view of a vacuum valve according to one embodiment of the present invention.
Figure 2:
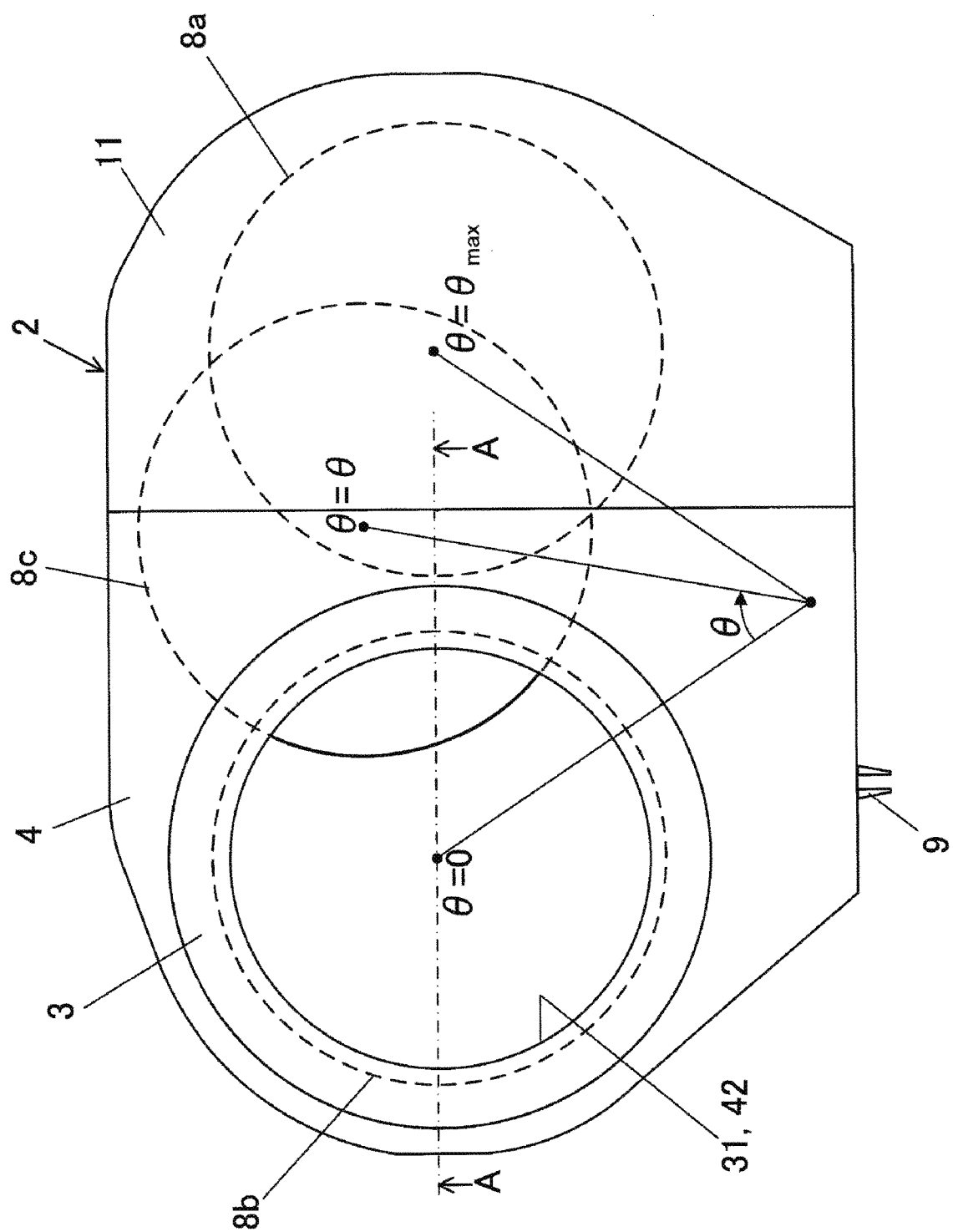
FIG. 2 is a plan view of the vacuum valve.
Figure 3A:
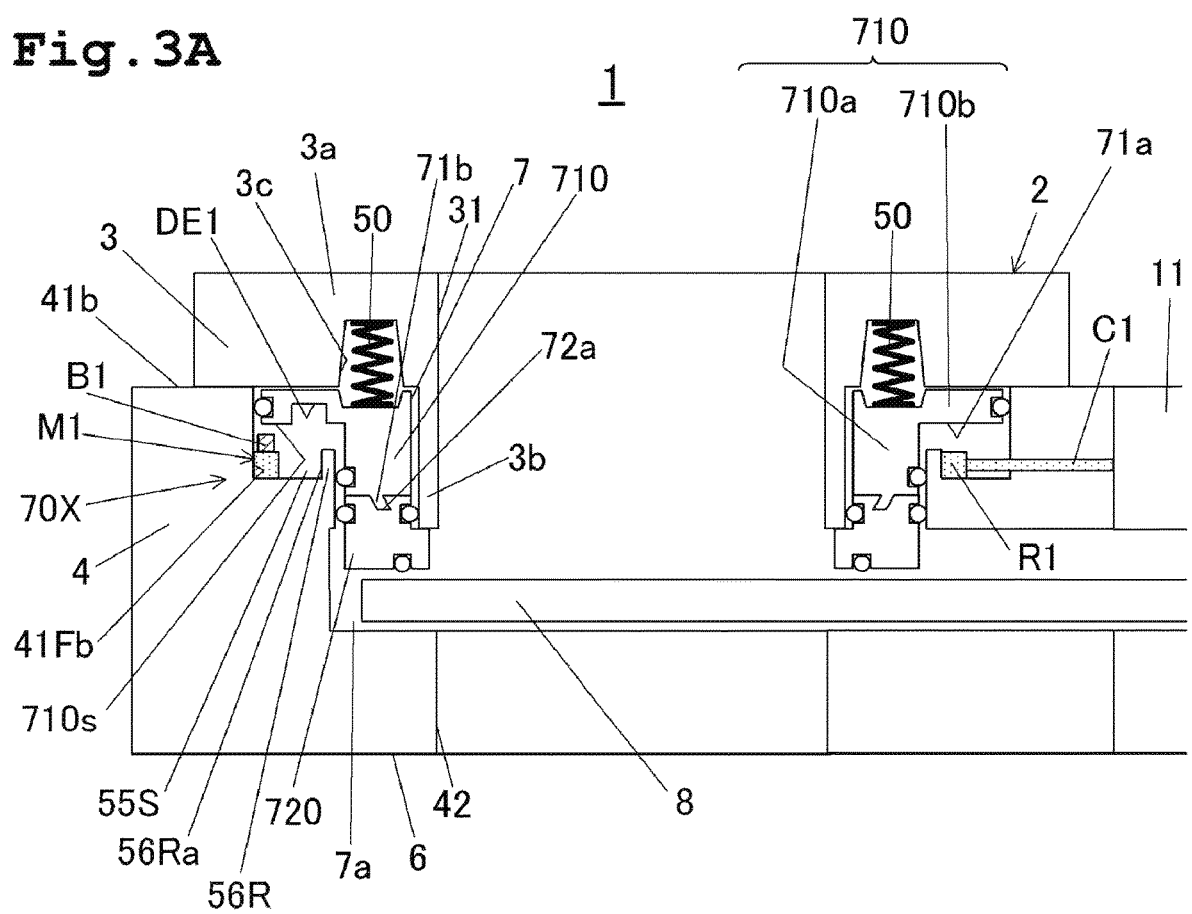
FIG. 3A is a sectional view along an A-A line of FIG. 2 for describing an internal structure of the vacuum valve when a sealing body 7 is at a "flow path open position.
Figure 3B:
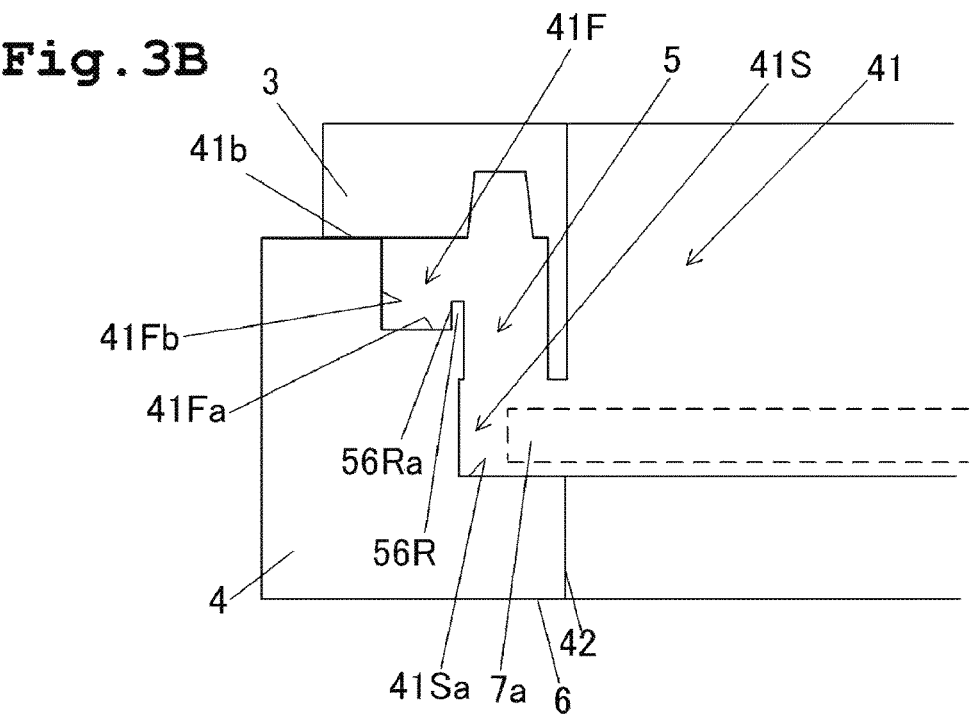
" and FIG. 3B is a detail view of a main portion.
Figure 5:
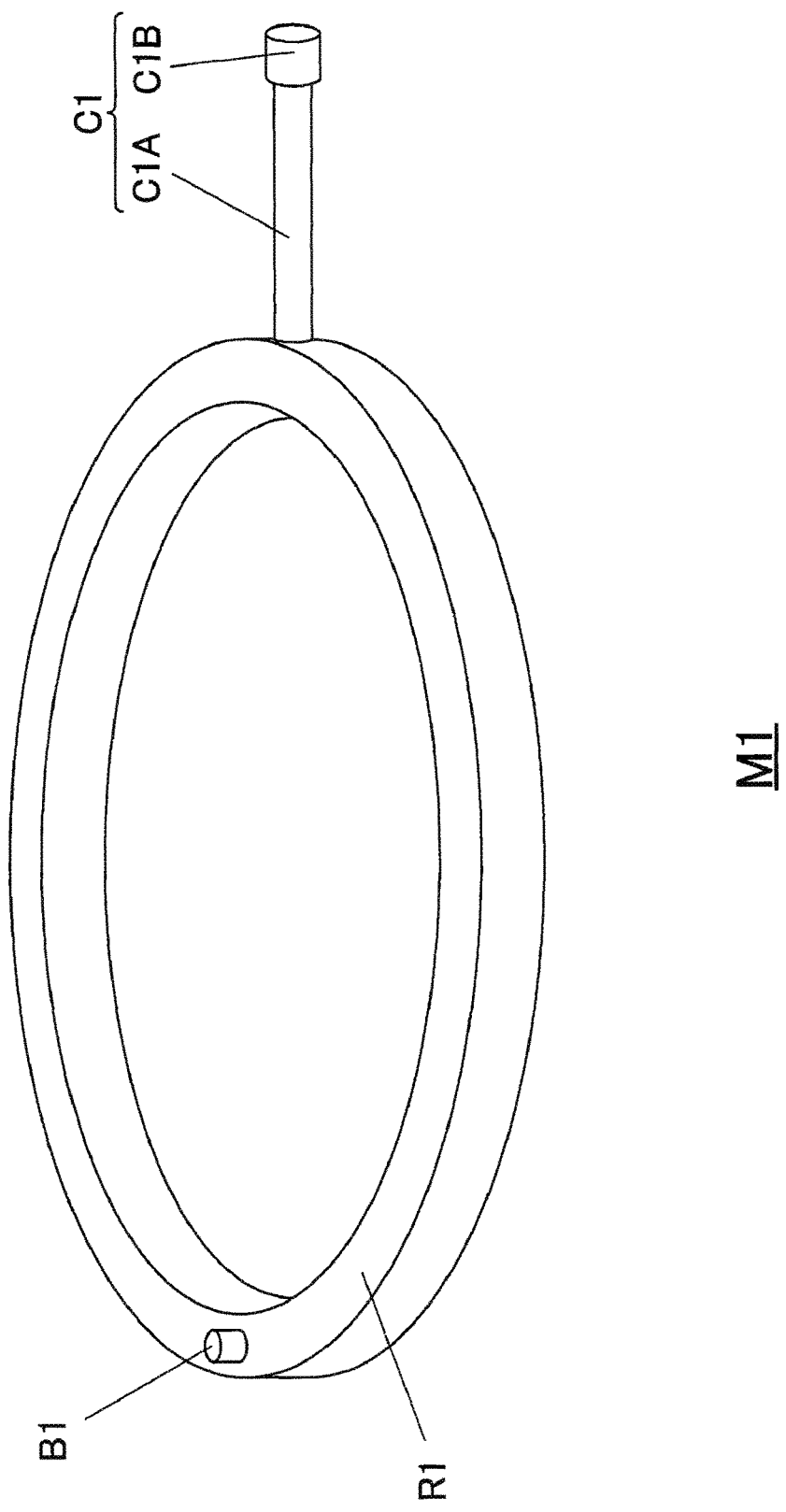
FIG. 5 is a perspective view of a mechanical stopper.

A vacuum valve of one embodiment of the present invention will be described with reference to FIGS. 1 to 9. FIG. 1 is a perspective view of an outer appearance of the vacuum valve. FIG. 2 is a plan view of the vacuum valve for describing swinging of a valve body. FIGS. 3A, 3B, and 4 are sectional views along an A-A line of FIG. 2. FIG. 5 is a perspective view of a mechanical stopper.

<Overview of Vacuum Valve 1>

A vacuum valve 1 is interposed between a not-shown vacuum chamber and a not-shown vacuum pump. A gas flow path GP is formed in the vacuum valve 1, and the flow rate of gas passing through the gas flow path GP is adjusted in such a manner that a drive section 10 controls a valve body 8 to an optional angular position between a fully-closed angular position and a fully-opened angular position.

The drive section 10 includes a motor (not shown) configured to swingably drive the valve body 8 in a later-described θ direction, and a control section (not shown) configured to drivably control the motor.

The valve body 8 is swingably driven by the motor of the drive section 10 such that the opening degree θ thereof changes. According to the opening degree θ of the valve body 8, the flow rate of gas flowing from the vacuum chamber to the vacuum pump is adjusted.

<Angular Position of Valve Body 8>

FIG. 2 is the view of the vacuum valve 1 of FIG. 1 from an arrow YA1. A sign "θ" illustrated in FIG. 2 represents the opening degree θ of the valve body 8.

A valve body 8a indicated by a dashed line shows a state at such an angular position (θ=θmax) that the gas flow path GP is fully opened. A valve body 8b indicated by a dashed line shows a state at such an angular position (θ=0) that the gas flow path GP is fully closed. As will be described later with reference to FIG. 4, the valve body 8b at the fully-closed angular position is pressed against a later-described seating surface 41Sa by a sealing body 7 biased by a spring 50. As will be described later with reference to FIG. 9, when the valve body 8a is at the fully-opened angular position, the force of biasing the sealing body 7 by the spring 50 is released by compressed air.

A valve body 8c illustrated in FIG. 2 shows a state at an opening degree θ between a fully-closed state and a fully-opened state. When the sealing body 7 (see FIGS. 3A and 3B) presses the valve body 8c with a portion of the valve body 8c being exposed in the gas flow path GP, there is a probability that due to tilting of the sealing body 7, subsequent smooth driving cannot be performed (see FIG. 11). The vacuum valve 1 of the present embodiment includes a later-described mechanical stopper M1 to avoid excessive pressing by the sealing body 7.

<Vacuum Valve 1>

FIGS. 3A and 3B are the sectional views along the A-A line of FIG. 2, the sectional views being sectional views of the vacuum valve 1 in a flow path direction. FIGS. 3A and 3B illustrate the valve body 8 in the fully-closed state (θ=0).

The vacuum valve 1 includes a housing 2, a slide plate, i.e., the valve body 8, slidably driven in the housing 2, and the drive section 10 for the valve body 8. The housing 2 includes a housing base portion 4, an upper flange 3 attached to the housing base portion 4 with a bolt, and a bonnet 11 attached to the housing base portion 4 with a bolt. The housing base portion 4 is entirely formed in an outer shape illustrated in FIG. 1, and the bonnet 11 is detachably provided at one end of the housing base portion 4. A lower flange 6 (see FIGS. 3A and 3B) is formed at a lower surface of the housing base portion 4, and a coupler 9 (see FIG. 1) is attached to the periphery of the housing base portion 4.

The vacuum valve 1 is, by the upper flange 3, connected to the vacuum chamber in a not-shown vacuum processing device. The not-shown vacuum pump is fixed to the lower flange 6. As described above, the vacuum valve 1 is interposed between the vacuum chamber and the vacuum pump.

Description will be also made with reference to FIG. 3B. A stepped opening 41 is provided at a center portion of the housing base portion 4. The stepped opening 41 has a first step portion 41F formed on a vacuum chamber side, and a second step portion 41S formed continuous to the first step portion 41F. An opening 42 is formed continuous to the second step portion 41S on a vacuum pump connection side of the stepped opening 41. An upper flange mounting surface 41b is formed at a vacuum-chamber-side upper surface of the housing base portion 4, i.e., the outer periphery of the first step portion 41F. The lower flange 6 is formed at the outer periphery of the opening 42 at the vacuum-pump-side lower surface of the housing base portion 4.

The upper flange 3 is mounted on the upper flange mounting surface 41b of the housing base portion 4, and is integrated with the housing base portion 4. The upper flange 3 has a flange portion 3a and a cylindrical portion 3b formed continuous to the flange portion 3a. On the inside of the cylindrical portion 3b, an opening 31 forms the gas flow path GP. A spring housing portion 3c is formed recessed at the flange portion 3a, and the compression spring 50 configured to drive the later-described sealing body 7 is provided in the spring housing portion 3c.

An annular protrusion 56R is provided to stand along an inner edge of a bottom surface 41Fa of the first step portion 41F. The cylindrical portion 3b of the upper flange 3 is provided to extend beyond the bottom surface 41Fa in a vacuum pump direction, i.e., a gas downstream direction.

The opening 31 formed at the inner periphery of the upper flange 3 and the opening 42 formed at the inner periphery of the housing base portion 4 are in a coaxial circular shape as viewed in the plane. The opening 31 and the opening 42 forms the gas flow path GP connecting between the vacuum chamber and the vacuum pump. Thus, gas of the vacuum chamber enters the vacuum valve 1 through the opening 31, and is discharged to the outside of the vacuum valve, i.e., to the vacuum pump, through the opening 42.

The valve body seating surface 41Sa is formed at a bottom surface of the second step portion 41S. A valve body housing portion 7a having a predetermined length in an axial direction is provided between the seating surface 41Sa and a lower end of the cylindrical portion 3b of the upper flange 3. The valve body 8 is rotatably disposed at the valve body housing portion 7a. The gas flow path GP is opened/closed by the valve body 8. Moreover, the opening area of the gas flow path GP is adjusted according to the opening degree of the valve body 8, and the internal pressure of the vacuum chamber is controlled by the opening area.

A sealing body housing portion 5 (FIG. 3B) formed in a stepped annular shape is defined between an outer peripheral surface of the cylindrical portion 3b of the upper flange 3 and an inner peripheral surface 41c of the stepped opening 41 of the housing base portion 4, and the annular sealing body 7 is housed in the housing portion 5.

The valve body 8 is, by the drive section 10 in the bonnet 11, swung between the fully-opened angular position for fully opening the gas flow path GP and the fully-closed angular position for fully closing the gas flow path GP. The valve body 8 at the fully-closed angular position is pressed against the seating surface 41Sa by the sealing body 7 biased in the gas downstream direction by the spring 50, and accordingly, the gas flow path GP is blocked. A height position at which the valve body 8 is pressed against the seating surface 41Sa will be referred to as a "blocking position." Such a state is illustrated in FIG. 4.

As illustrated in FIG. 3A, when the biasing force of the spring 50 is released by the compressed air, the valve body 8 moves from the seating surface 41Sa in a gas upstream direction. Such a state is illustrated in FIGS. 3A and 3B. That is, when the gas flow path GP is fully opened and the valve body 8 adjusts the flow path area, the valve body 8 is positioned above the blocking position. Upon maintenance of the sealing body 7, the valve body 8 is retracted to the fully-opened angular position for fully opening the flow path, and the sealing body 7 is pressed down to the lowermost position by the spring 50. The sealing body 7 will be described later in detail.

The bonnet 11 can be detached from the housing 2 in such a manner that the bolt fastened to the housing base portion 4 is detached. As described above, the bonnet 11 is detachable so that the housing 2 can be divided. Thus, in a state in which the vacuum valve 1 is attached to the vacuum chamber and the vacuum pump, the valve body 8, a later-described seal ring, etc. can be replaced.

<Sealing Body 7>

The annular sealing body 7 is housed in the above-described sealing body housing portion 5. That is, the sealing body 7 is disposed on a vacuum pumping upstream side (the upper side as viewed in the figure) with respect to the valve body 8.

The sealing body 7 includes a piston portion 710 and the seal ring 720. The piston portion 710 and the seal ring 720 detachably engage with each other by a protrusion 71b and a recessed portion 72a. Thus, both can integrally move as the sealing body 7. An O-ring configured to seal between an inner surface of the housing base portion 4 and each of the outer peripheries of the piston portion 710 and the seal ring 720 is provided at each of the outer peripheries of the piston portion 710 and the seal ring 720.

The piston portion 710 has a cylindrical piston base portion 710a and a flange portion 710b formed on the vacuum chamber side of the piston base portion 710a. An O-ring configured to seal between an outer peripheral surface of the flange portion 710b and the inner surface of the housing base portion 4 is provided on the outer peripheral surface of the flange portion 710b.

A gas-downstream-side surface of the flange portion 710b of the piston portion 710 functions as a pressure receiving portion 71a. That is, an outer peripheral surface of the piston base portion 710a and a lower surface of the flange portion 710b both face the first step portion 41F, and a closed space 55S surrounded by these surfaces is formed. The compressed air (air pressure) is, through the coupler 9, sent to the space 55S (hereinafter referred to as an "air pressure introduction space 55S") between the sealing body 7 and the housing base portion 4. A not-shown air pressure control valve controls air pressure supply and blocking. In this embodiment, the air pressure control valve is configured to block the air pressure supply upon blackout.

The piston portion 710 receives, at the pressure receiving portion 71a, the air pressure sent through the coupler 9, and therefore, receives upward force as viewed in the figure. Moreover, the piston portion 710 receives, from the compression spring 50, downward force as viewed in the figure. These types of force allow the sealing body 7 to move in an upper-to-lower direction as viewed in the figure, i.e., in the gas downstream direction and the gas upstream direction. In the present embodiment, the air pressure control valve blocks the air pressure supply upon blackout. Thus, when blackout occurs, the sealing body 7 moves downward by the downward force of the compression spring 50 as viewed in the figure.

As described above, the sealing body 7 of the vacuum valve 1 of the present embodiment is driven in the gas downstream direction by the compression spring 50. The force in the upstream direction is realized by an air pressure drive section 70X configured to drive the sealing body 7 in the gas upstream direction by the force acting on the pressure receiving portion 71a by the air pressure introduced into the air pressure introduction space 55S.

The mechanical stopper M1 is disposed in the air pressure introduction space 55S. FIG. 5 is the perspective view of the mechanical stopper M1. The mechanical stopper M1 has a ring-shaped drive member R1. A restriction protrusion B1 configured to inhibit the sealing body 7 from moving to a maintenance position is provided to protrude from the drive member R1. A rod-shaped operation section C1 is connected to the drive member R1 on the opposite side of the restriction protrusion B1. The operation section C1 has a small-diameter portion C1A fixed to the drive member R1, and a large-diameter portion C1B provided at a tip end of the small-diameter portion CIA. The mechanical stopper M1 is mounted on the bottom surface 41Fa of the first step portion 41F, and is movable between an inner peripheral surface 41Fb of the first step portion 41F and an outer peripheral surface 56Ra of the annular protrusion 56R standing on the bottom surface 41Fa.

The pressure receiving portion 71a of the flange portion 710b is provided with a recessed portion DE1. As will be described later, this is for avoiding restriction of the position of the sealing body 7 by the mechanical stopper M1 upon maintenance.

Figure 9:
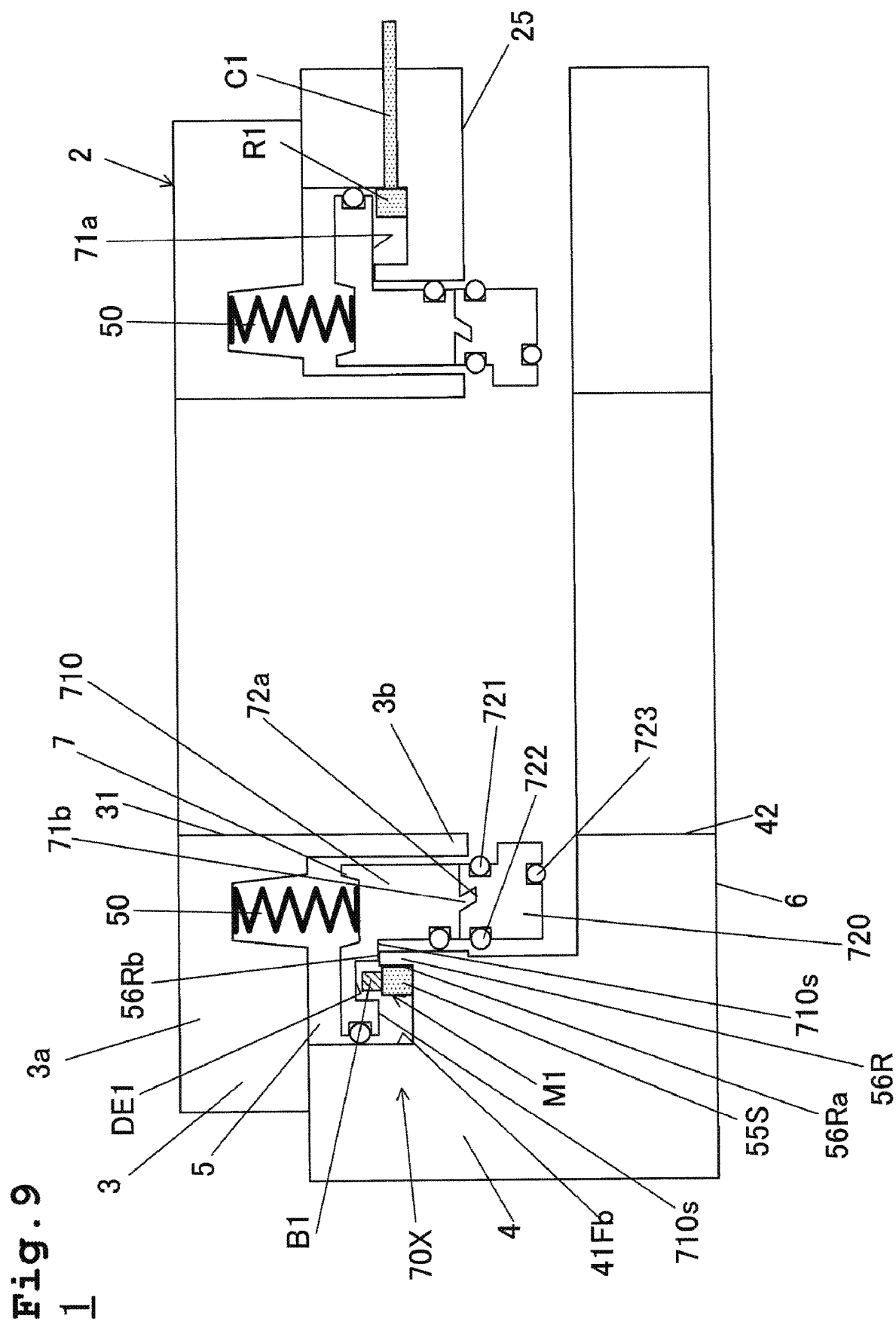
FIG. 9 is a sectional view along the A-A line of FIG. 2 for describing the internal structure of the vacuum valve when the sealing body 7 is at a "maintenance position;"

Available positions of the sealing body 7 will be described herein. The sealing body 7 can be at a "flow path open position," a "flow path blocked position," a "maintenance position," and a "restriction position." The "flow path open position" is a position at which the sealing body 7 does not contact the valve body 8, i.e., a position at which the valve body 8 is swingable. Such a position is illustrated in FIGS. 3A and 3B. The "flow path blocked position" is a position at which the sealing body 7 contacts the valve body 8, and is illustrated in FIG. 4. The "maintenance position" is a position for attaching/detaching the seal ring 720, and is illustrated in FIG. 9. The "restriction position" is a position at which the sealing body 7 having lost drive force due to sudden blackout etc. is restricted by the mechanical stopper M1, and is illustrated in FIG. 7.

Note that a state when the vacuum valve 1 is used with the sealing body 7 being at the "flow path open position" or the "flow path blocked position" will be referred to as a "normal use state," and a state when maintenance of the vacuum valve 1 is performed with the sealing body 7 being at the maintenance position will be referred to as a "maintenance state." Moreover, a state when the sealing body 7 is at an emergency position will be referred to as an "emergency state."

FIGS. 3A and 3B illustrate the sealing body 7 at the "flow path open position." Description will be also made with reference to FIG. 2. At the "flow path open position," the valve body 8 is adjusted to an optional position 8c (θ=θ) between the fully-closed state (θ=0) and the fully-opened state (θ=θmax). The "flow path open position" of FIGS. 3A and 3B is realized in such a manner that the air pressure introduced into the air pressure introduction space 55S is adjusted to a predetermined pressure and the resultant air pressure is used to generate force against compression force of the compression spring 50.

FIG. 4 illustrates the sealing body 7 at the "flow path blocked position." Moreover, the valve body 8 is in the fully-closed state (θ=0). In this state, the valve body 8 is pressed against the seating surface 41Sa of the second step portion 41S by the sealing body 7. This brings a valve closed state, and the flow of gas passing in the vacuum valve 1 is blocked. FIG. 4 is mainly different from FIGS. 3A and 3B in the position of the sealing body 7.

Note that the sealing body 7 of FIG. 4 is, as viewed in the figure, positioned below the sealing body 7 of FIGS. 3A and 3B. The pressure receiving portion 71a of the piston portion 710 of the sealing body 7 does not contact the mechanical stopper M1, and is apart from the mechanical stopper M1 by a predetermined distance such as 0.5 mm to 1.0 mm.

Figure 6A:
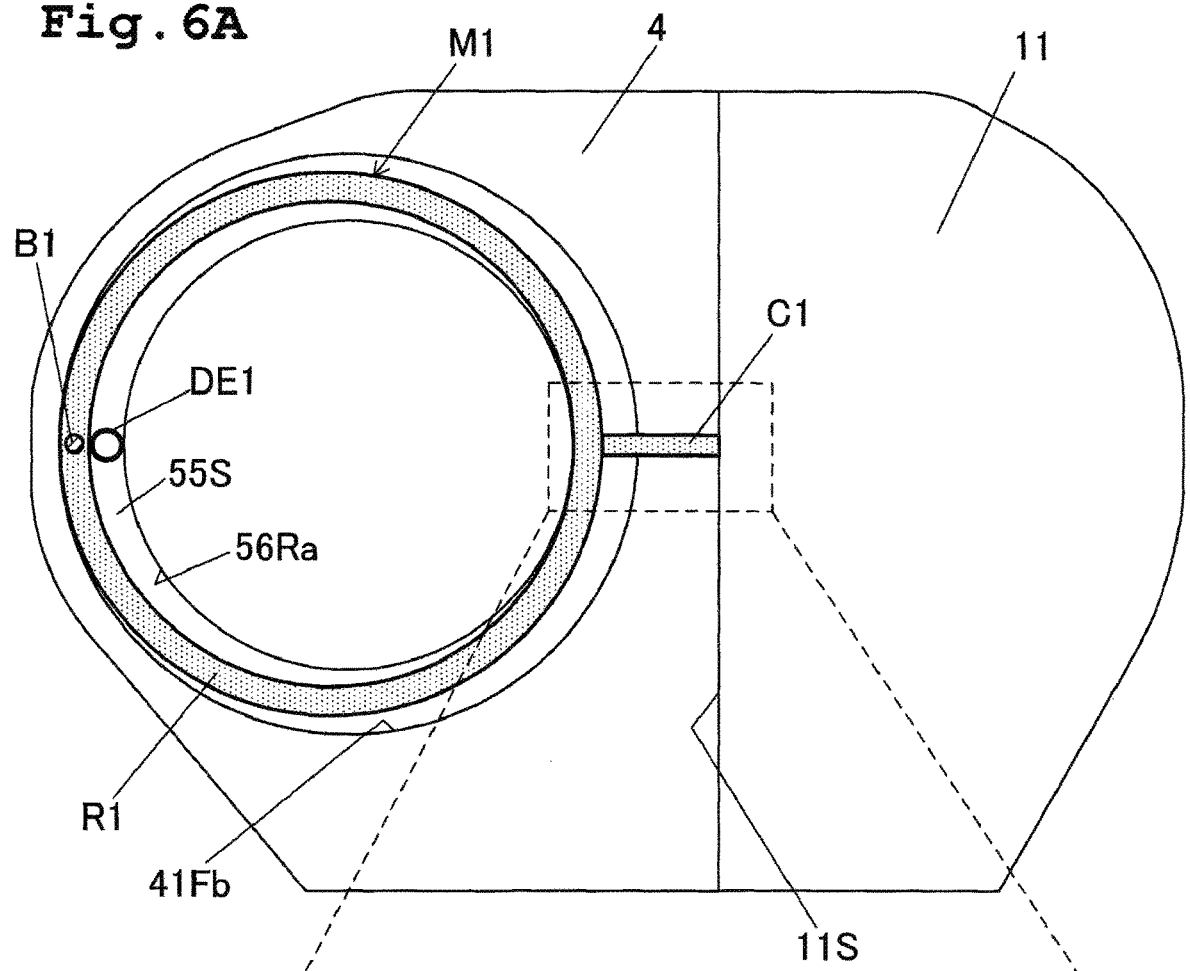
FIGS. 6A and 6B are views of the position of the mechanical stopper in a normal use state.
Figure 6B:
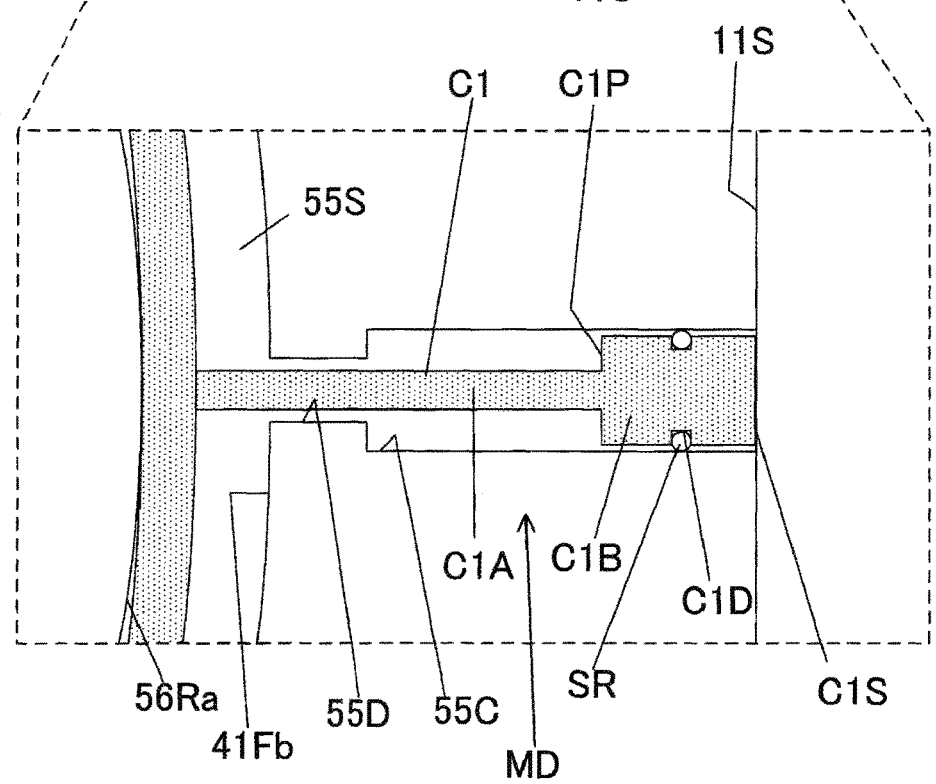

FIG. 6A is a view for describing operation of the mechanical stopper M1 in the normal use state and the emergency state. FIG. 6B is an enlarged view of the periphery of the operation section C1 of FIG. 6A. Operation and function of the mechanical stopper M1 in the normal use state and the emergency state will be described with reference to FIGS. 6A and 6B.

Although having been described above, the operation section C1 has, as illustrated in FIG. 6B, the small-diameter portion C1A fixed to the drive member R1, and the large-diameter portion C1B provided at the tip end of the small-diameter portion C1A. The housing base portion 4 is provided with a space 55C in which the large-diameter portion C1B of the operation section C1 is housed and a space 55D through which the space 55C and the air pressure introduction space 55S communicate with each other. A space between an inner peripheral surface of the space 55C and the small-diameter portion C1A is sealed by an O-ring.

When the position of the sealing body 7 is controlled to the "flow path open position" illustrated in FIG. 3A, the air pressure adjusted to the predetermined pressure is introduced into the air pressure introduction space 55S. Such air pressure is also guided from the space 55D to the space 55C, and acts on a pressure receiving surface C1P of the large-diameter portion C1B. Thus, the operation section C1 receives rightward force from the air pressure as viewed in the figure. However, the bonnet 11 is attached to the housing base portion 4 in the normal use state, and therefore, the operation section C1 cannot move to the right as viewed in the figure.

That is, in the normal use state, the bonnet 11 is fixed to the housing base portion 4 as illustrated in FIG. 6A. The bonnet 11 is firmly fixed with a fastening member such as the bolt of the housing base portion 4, and therefore, the rightward force received from the air pressure by the pressure receiving surface C1P of the large-diameter portion C1B is held at an end surface 11S of the bonnet 11. Thus, as illustrated in FIG. 6A, an outer peripheral surface of the drive member R1 on a side (the left side as viewed in the figure) provided with the restriction protrusion B1 contacts the inner peripheral surface 41Fb of the first step portion 41F, and an inner peripheral surface of the drive member R1 on a side (the right side as viewed in the figure) provided with the operation section C1 contacts the annular protrusion 56R. That is, the position of the mechanical stopper M1 is controlled to a restriction position, i.e., a first position, at which the mechanical stopper M1 is pressed against a left end of the air pressure introduction space 55S as viewed in the figure.

FIG. 7 illustrates a state (the emergency state) when the compressed air supply is blocked due to sudden blackout etc. and the sealing body 7 is at the restriction position after having been moved downward by the spring 50 as viewed in the figure. In FIG. 7, a partial region of the valve body 8 protrudes into the gas flow path GP. This position of the valve body 8 is a position indicated by a reference numeral "8c" of FIG. 2.

In FIG. 7, the valve body 8 is at the position indicated by the reference numeral "8c" of FIG. 2. Thus, at a right portion (hereinafter referred to as a "right portion") as viewed in the figure, the valve body 8 is sandwiched between the seal ring 720 and the seating surface 41Sa. On the other hand, the valve body 8 is not present below a left portion (hereinafter referred to as a "left portion") of the seal ring 720 as viewed in the figure. Thus, the left portion of the seal ring 720 tends to move lower than the right portion thereof as viewed in the figure. In FIG. 7, the pressure receiving portion 71a of the sealing body 7 contacts, at a surface 710s, the restriction protrusion B1 of the mechanical stopper M1. Thus, movement of the left portion of the seal ring 720 as described above is restricted. This can prevent operation failure due to tilting of the sealing body 7.

The vacuum valve 1 of the present embodiment includes an operation mechanism MD configured to move, in association with attachment/detachment of the bonnet 11, the mechanical stopper M1 between the first position and a second position. The operation mechanism MD includes, for example, the operation section C1 having the large-diameter portion C1B with the pressure receiving surface C1P, and the air pressure introduction spaces 55C, 55D in which the compressed air causes the air pressure to act on the operation section C1.

The position of each configuration in the maintenance state will be described with reference to FIGS. 8A, 8B, and 9.

FIG. 8A is a view for describing operation of the mechanical stopper M1 in the maintenance state. FIG. 8B is an enlarged view of the periphery of the operation section C1 of FIG. 8A. An arrangement location of the mechanical stopper M1 in the maintenance state will be described with reference to FIGS. 8A and 8B.

As illustrated in FIG. 8A, the bonnet 11 is detached for replacement of the valve body 8, the seal ring 720, etc. in the maintenance state. Thus, an end surface C1S of the operation section C1 no longer receives the force from the end surface 11S of the bonnet 11. As described above, the operation section C1 receives, as viewed in the figure, the rightward force from the air pressure acting on the pressure receiving surface C1P of the large-diameter portion C1B. Thus, when the bonnet 11 is detached, the mechanical stopper M1 moves toward the right side as viewed in the figure. Such a movement direction is a direction perpendicular to the flow path of the vacuum valve 1. The outer peripheral surface of the drive member R1 on a side (the right side as viewed in the figure) close to the operation section C1 contacts the inner peripheral surface 41Fb of the first step portion 41F. The inner peripheral surface of the drive member R1 on a side (the left side as viewed in the figure) close to the restriction protrusion B1 contacts the outer peripheral surface 56Ra of the annular protrusion 56R. Thus, rightward movement of the mechanical stopper M1 as viewed in the figure is stopped. By such movement, the mechanical stopper M1 is disposed at a right end of the air pressure introduction space 55S as viewed in the figure. Because of movement to such a position, the restriction protrusion B1 of the mechanical stopper M1 faces the recessed portion DE1 of the piston portion 710 of the sealing body 7. The recessed portion DE1 is designed to house the restriction protrusion B1.

FIG. 9 is a sectional view along the A-A line of FIG. 2 in the maintenance state. Since the valve body 8 is detached, the valve body 8 is not shown in the figure. In addition, FIG. 9 is mainly different from FIGS. 3A and 3B in the positions of the sealing body 7 and the mechanical stopper M1.

As illustrated in FIG. 9, the mechanical stopper M1 in the maintenance state moves, as viewed in the figure, to the right side from the position illustrated in FIGS. 3A and 3B, and is positioned at the right end of the air pressure introduction space 55S as viewed in the figure. Thus, the restriction protrusion B1 of the mechanical stopper M1 faces the recessed portion DE1 of the piston portion 710 of the sealing body 7.

When the compressed air is blocked due to blackout, the sealing body 7 is moved in the gas downstream direction by the biasing force of the compression spring 50. As illustrated in FIG. 7, when the mechanical stopper M1 is at the first position, the pressure receiving portion 71a contacts the restriction protrusion B1, and movement of the sealing body 7 beyond the "restriction position" in the gas downstream direction is inhibited. In the maintenance state, the mechanical stopper M1 is at the second position illustrated in FIG. 9. At the second position, the restriction protrusion B1 faces the recessed portion DE1. When the air pressure supply to the air pressure introduction space 55S is blocked, the restriction protrusion B1 enters the recessed portion DE1 due to the downward biasing force of the compression spring 50, and therefore, the sealing body 7 moves to the maintenance position of FIG. 9.

The recessed portion DE1 is for avoiding contact between the sealing body 7 and the mechanical stopper M1 in the maintenance state.

As described above, when the mechanical stopper M1 is positioned at the right end of the air pressure introduction space 55S as viewed in the figure, the sealing body 7 can move downward to the "maintenance position" as viewed in the figure.

Note that it is designed that when the sealing body 7 reaches the "maintenance position," the pressure receiving portion 71a of the piston portion 710 of the sealing body 7 contacts an upper end surface 56Rb of the annular protrusion 56R of the housing base portion 4. That is, in the present embodiment, the "maintenance position" of the sealing body 7 is, as illustrated in FIG. 9, defined by the height of the annular protrusion 56R.

Note that the "maintenance position" may be defined by contact between a bottom surface of the recessed portion DE1 of the sealing body 7 and the restriction protrusion B1 of the mechanical stopper M1.

The process of moving, as viewed in the figure, the mechanical stopper M1 from the right end (FIGS. 8A and 8B) of the air pressure introduction space 55S to the left end (FIGS. 6A and 6B) of the air pressure introduction space 55S is as follows. The sealing body 7 is controlled to the position in the normal use state. That is, the compressed air is introduced into the space 55S, and the sealing body 7 is controlled to the normal use position against the biasing force of the compression spring 50. When the bonnet 11 is attached to the housing base portion 4, the end surface 11S of the bonnet 11 presses the end surface C1S of the operation section C1, and the mechanical stopper M1 moves to the position of FIGS. 6A and 6B against the force of the air pressure.

As described above, the mechanical stopper M1 is, in association with attachment/detachment of the bonnet 11, movable between the first position as the restriction position and the second position as a non-restriction position. Since the bonnet 11 is attached in other states than the maintenance state, the mechanical stopper M1 can be reliably at the restriction position in other states than the maintenance state, and the height position of the sealing body 7 is restricted at the "restriction position."

When the sealing body 7 has moved to the "maintenance position," seal materials 721, 722, 723 of the seal ring 720 no longer contact a wall surface of the housing portion 5. This allows attachment/detachment of the seal ring 720. The seal ring 720 is replaced through an opening 25 of the housing 2. A not-shown single handle portion is provided at an outer peripheral surface of the seal ring 720, and a user operates the handle portion through the opening 25 so that the seal ring 720 can be detached. Specific description will be made. The user holds the handle portion of the seal ring 720, and rotates the handle portion about the axis of the annular sealing body 7. In this manner, the recessed portion 72a of the seal ring 720 and the protrusion 71b of the piston portion 710 are disengaged from each other. Thus, the seal ring 720 can be detached from the sealing body 7, and can be replaced.

The vacuum valve 1 of the above-described embodiment includes the housing 2 configured such that the flow path of gas passing through the pair of opposing openings is formed, the valve body 8 detachably inserted into the flow path GP to control the opening area of the flow path, the sealing body 7 configured to movably push the valve body 8 when the flow path GP is blocked by the valve body 8, the drive section (50, 70X) configured to drive the sealing body 7 in the upstream and downstream directions of the gas, and the mechanical stopper M1 including the restriction protrusion B1 configured to inhibit, at the "restriction position," movement of the sealing body 7 in the gas downstream direction. The mechanical stopper M1 is operable between the first position at which movement of the sealing body 7 toward the gas downstream side is inhibited at the "restriction position" as illustrated in FIG. 6A or the second position at which movement of the sealing body 7 from the "restriction position" to the non-restriction position, i.e., the "maintenance position" on the gas downstream side is allowed as illustrated in FIG. 8A.

The vacuum valve 1 having the above-described configuration provides the following features and advantageous effects.

(1) The vacuum valve 1 of the present embodiment includes the mechanical stopper M1 having the restriction protrusion B1 configured to restrict movement of the sealing body 7. As illustrated in FIG. 7, the restriction protrusion B1 restricts movement of the sealing body 7 in the normal use state, thereby inhibiting movement of the seal ring 720 to the "maintenance position." That is, movement of the sealing body 7 in the gas downstream direction is restricted at the "restriction position" by the restriction protrusion B1.

With this configuration, even when the valve body 8 not positioned at the fully-closed position is pressed by the sealing body 7 due to sudden blackout etc., tilting of the sealing body 7 can be prevented. As a result, catching of the sealing body 7 can be prevented, and therefore, operation failure of the sealing body 7 can be prevented. Moreover, degradation of sealability of the seal materials between the sealing body 7 and the housing 2 can be prevented.

(2) The sealing body 7 of the vacuum valve 1 of the embodiment includes the seal ring 720 contacting the valve body 8, and the piston portion 710 to which the seal ring 720 is attached. The "maintenance position," i.e., the non-restriction position, of the sealing body 7 illustrated in FIG. 9 is the position at which the seal ring 720 is detachable from the piston portion 710. In the normal use state, the mechanical stopper M1 is at such a position (FIGS. 6A and 6B) that the restriction protrusion B1 approaches the inner peripheral surface 41Fb in the air pressure introduction space 55S. In the maintenance state, the mechanical stopper M1 is at such a position (FIGS. 8A and 8B) that the restriction protrusion B1 approaches the outer peripheral surface 56Ra of the annular protrusion 56R in the air pressure introduction space 55S.

As described above, in the vacuum valve 1 of the present embodiment, the mechanical stopper M1 is operable between the first position in the normal use state and the second position in the maintenance state. As a result, even when the structure of restricting the sealing body 7 at the "restriction position" as in FIG. 7 is employed, the sealing body 7 can be, in the maintenance state, further moved to the non-restriction position as the "maintenance position" on the gas downstream side of the "restriction position." When the sealing body 7 is at the "maintenance position," the seal ring 720 can be detached from the piston portion 710, and can be attached again.

(3) The housing 2 of the vacuum valve 1 of the embodiment further includes the housing base portion 4 provided with the pair of openings, the bonnet 11 detachably provided at the housing base portion 4, and the operation mechanism MD configured to move, in association with attachment/detachment of the bonnet 11, the mechanical stopper M1 between the first position and the second position. As described above, in the vacuum valve 1 of the embodiment, movement of the mechanical stopper M1 between the first position and the second position is in association with attachment/detachment of the bonnet 11 to the housing base portion 4.

This can prevent failure in arrangement of the mechanical stopper M1 at the above-described position in the normal use state.

(4) The operation mechanism MD of the vacuum valve of the embodiment is pushed by the bonnet 11 to move the mechanical stopper M1 to the first position (FIGS. 6A and 6B) in the normal use state when the bonnet 11 is attached to the housing 2. The operation mechanism MD uses the pressure of the compressed air to move the mechanical stopper M1 to the second position (FIGS. 8A and 8B) when the bonnet 11 is detached from the housing 2. That is, the operation mechanism MD mechanically movably pushes the mechanical stopper M1 by attachment/detachment of the bonnet 11, and therefore, has a simpler structure than that of an electric control type or a manual operation type.

(5) The drive section 70X of the sealing body 7 of the embodiment further includes the pressure receiving portion 71a configured to push back the sealing body 7 in the gas upstream direction against the biasing force of the compression spring 50 by the pressure of the compressed air. The space 55D is provided, the space 55D allowing communication between the air pressure introduction space 55S in which the compressed air acts on the large-diameter portion C1B of the operation mechanism MD and the air pressure introduction space 55C in which the compressed air acts on the pressure receiving portion 71a.

That is, the sealing body 7 is driven by the air pressure. The mechanical stopper M1 is disposed in the air pressure introduction space 55S, and is driven by the air pressure through the operation section C1. In this manner, the mechanical stopper M1 moves from the position in the normal use state to the position in the maintenance state.

With this configuration, the mechanical stopper M1 can be, using the air pressure, easily moved to the position in the maintenance state.

(6) In the vacuum valve of the embodiment, the sealing body 7 and the mechanical stopper M1 are the annular bodies surrounding the flow path GP. The sealing body 7 has the piston base portion 710a surrounding the flow path GP, and the annular flange portion 710b extending in an outer circumferential direction on one end side of the piston base portion 710a. The flange portion 710b forms the pressure receiving portion 71a. The restriction protrusion B1 of the mechanical stopper M1 is provided on the opposite side of the operation mechanism MD, and contacts the pressure receiving portion 71a to restrict the sealing body 7 at the "restriction position." That is, the restriction protrusion B1 and the operation section C1 are provided at the positions facing each other with respect to the drive member R1.

When the sealing body 7 does not uniformly contact the valve body 8 in the circumferential direction of the sealing body 7, the sealing body 7 tilts. Due to such tilting, the sealing body 7 easily sinks down at a position in the circumferential direction thereof.

With the above-described configuration, the restriction protrusion B1 is provided at the position at which the sealing body 7 easily sinks down, and therefore, tilting of the sealing body 7 can be prevented.

(7) The mechanical stopper M1 has the drive member R1 provided with the operation section C1.

With this configuration, remote operation can be made from a position facing the restriction protrusion B1 with respect to the openings 31, 41.

Under normal circumstances, the restriction protrusion B1 is, as viewed in FIG. 6A or 8A, operated from the left side (hereinafter referred to as a "restriction protrusion neighboring portion") in the vicinity of the restriction protrusion B1. However, under a situation where other devices etc. are arranged, it might be difficult to operate the restriction protrusion B1 from the restriction protrusion neighboring portion. In the vacuum valve 1 of the present embodiment, the restriction protrusion B1 can be remotely operated from the side close to the bonnet 11, and therefore, the position of the mechanical stopper M1 can be easily controlled even under the above-described situation.

(8) The mechanical stopper M1 of the embodiment is provided to move in the plane perpendicular to the flow path GP. The shape of the operation section C1 of the mechanical stopper M1 is the rod shape, and the mechanical stopper M1 moves parallel to the axial direction of the operation section C1. An O-ring provided on a circumferential surface of the large-diameter portion C1B of the operation section C1 seals between the circumferential surface of the large-diameter portion C1B and the housing base portion 4.

With this configuration, even when the mechanical stopper M1 moves, degradation of sealability of the O-ring provided on the circumferential surface of the large-diameter portion C1B of the operation section C1 can be prevented.

A vacuum valve 100 of a comparative example will be, with reference to FIGS. 10 and 11, described in comparison with the vacuum valve 1 of the present embodiment. Configurations similar to those of the vacuum valve 1 of the present embodiment will not be described.

FIG. 10 is a sectional view of the vacuum valve 100 of the comparative example, and illustrates a state in which a valve body 8 is fully closed. Unlike the vacuum valve 1 of the present embodiment, the vacuum valve 100 of the comparative example includes no mechanical stopper.

FIG. 11 is a view of a state (an emergency state) when upward drive force of a sealing body 7 as viewed in the figure is lost due to sudden blackout etc. with the valve body 8 being at the position of the valve body 8c of FIG. 2 in the vacuum valve 100 of the comparative example. As illustrated in FIG. 11, a right portion of the sealing body 7 is supported by the valve body 8, but a left portion of the sealing body 7 is not supported by the valve body 8. Since the vacuum valve 100 of the comparative example includes no mechanical stopper, the vacuum valve 100 does not have such a configuration that the left portion of the sealing body 7 not supported by the valve body 8 can be supported. For this reason, the sealing body 7 tilts such that the left portion of the sealing body 7 sinks down as viewed in the figure. Thus, there is a probability that the sealing body 7 is caught by a wall surface of a housing portion 5, leading to operation failure. Moreover, the left portion of the seal ring 720 moves to a maintenance position, and therefore, seal materials 721, 722 no longer contact the wall surface of the housing portion 5. Thus, sealability of the seal materials 721, 722 is degraded.

On the other hand, the vacuum valve 1 of the present embodiment includes the mechanical stopper M1. Thus, the restriction protrusion B1 of the mechanical stopper M1 supports the left portion of the sealing body 7 not supported by the valve body 8, and restricts downward movement of the left portion of the sealing body 7 as viewed in the figure (see FIG. 7).

With this configuration, tilting of the sealing body 7 can be prevented. As a result, the above-described various problems due to tilting of the sealing body 7 can be avoided.

The following variations are also included within the scope of the present invention.

Variation 1A

Figure 12A:
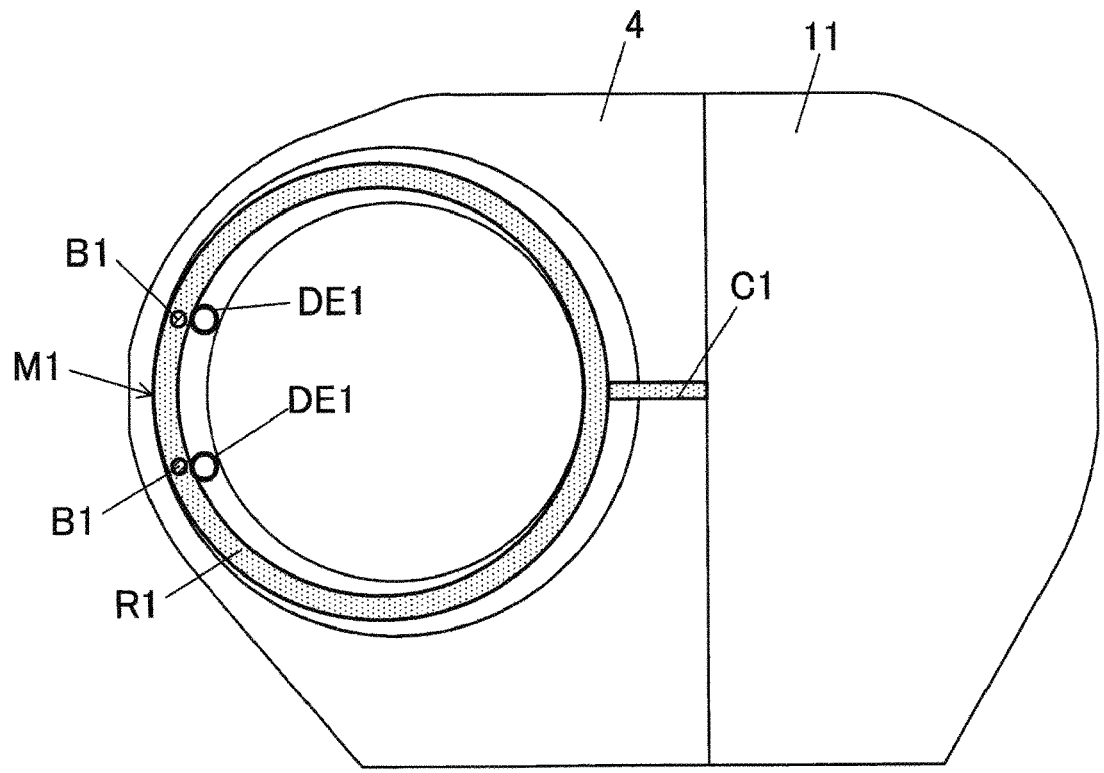
FIGS. 12A and 12B are views of a variation regarding a position at which restriction protrusions of the mechanical stopper are provided.

FIG. 12A is a view of a variation 1A. The variation 1A is a modification in the number of restriction protrusions B1 and the position of the restriction protrusion B1. In the variation 1A, two restriction protrusions B1 are provided. The positions at which the restriction protrusions B1 are provided are positions substantially facing the operation section C1. According to a change in the number of restriction protrusions B1 and the position of the restriction protrusion B1, the number of recessed portions DE1 and the position of the recessed portion DE1 are also changed, the recessed portion DE1 housing the restriction protrusion B1 in the maintenance state. With the present variation, advantageous effects similar to those of the above-described embodiment are provided.

Variation 1B

Figure 12B:
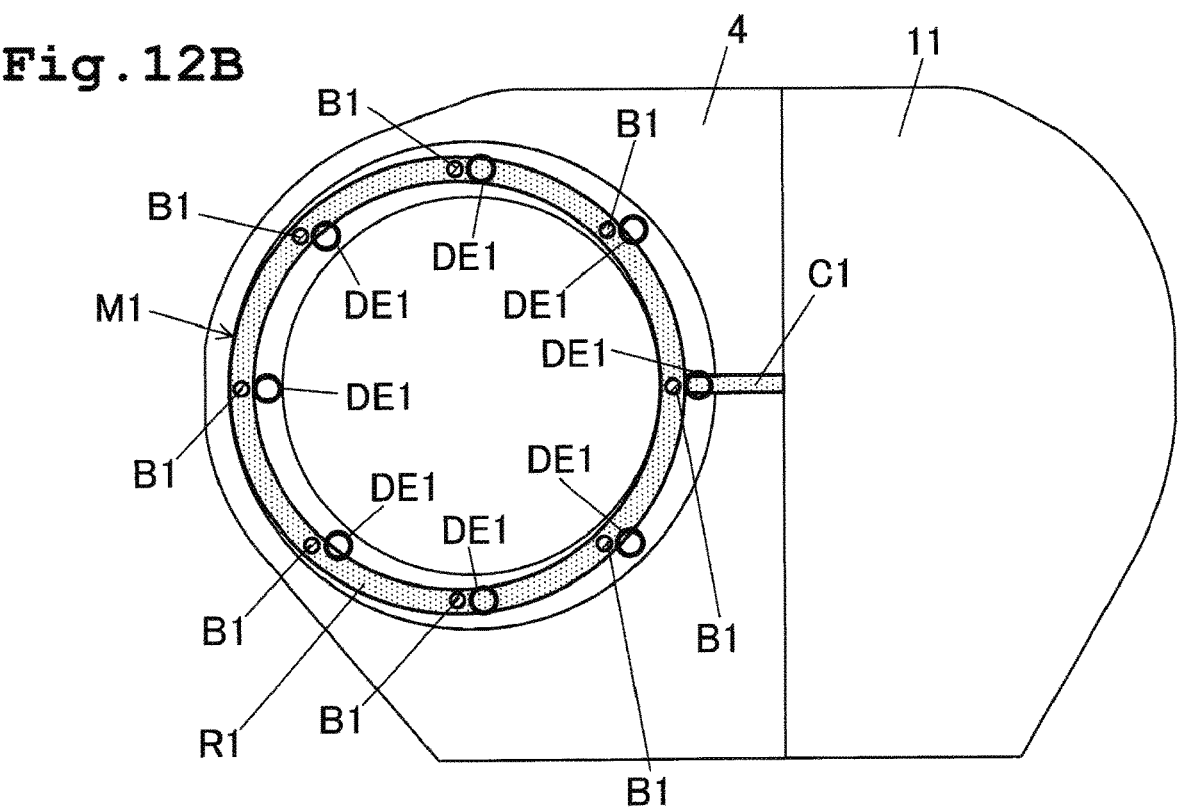

FIG. 12B is a view of a variation 1B. As in the variation 1A, the variation 1B is a modification in the number of restriction protrusions B1 and the position of the restriction protrusion B1. In the variation 1B, eight restriction protrusions B1 are provided. Further, the restriction protrusions B1 are arranged at equal intervals in a circumferential direction. According to a change in the number of restriction protrusions B1 and the position of the restriction protrusion B1, the number of recessed portions DE1 and the position of the recessed portion DE1 are also changed, the recessed portion DE1 housing the restriction protrusion B1 in the maintenance state. With the variation 1B, some of the restriction protrusions B1 substantially face the operation section C1, and therefore, advantageous effects similar to those of the above-described embodiment are provided.

Variation 2A

Figure 13A:
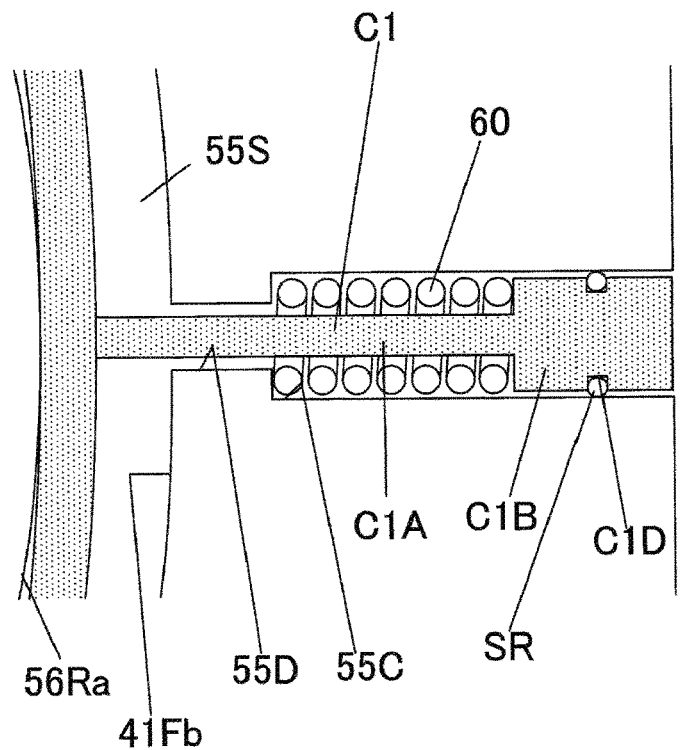
FIGS. 13A and 13B are views of a variation regarding the method for driving the mechanical stopper.

FIG. 13A is a view of a variation 2A. The variation 2A is a modification in driving of the operation section C1. In the variation 2A, a compression spring 60 is provided to surround the small-diameter portion C1A in the space 55C. Since the compression spring 60 is added to the above-described embodiment, the rightward drive force of the operation section C1, i.e., the mechanical stopper M1, as viewed in the figure increases as compared to the case of driving the mechanical stopper M1 by the compressed air. As a result, movement of the mechanical stopper M1 from the position in the normal use state to the position in the maintenance state can be accelerated.

Variation 2B

Figure 13B:
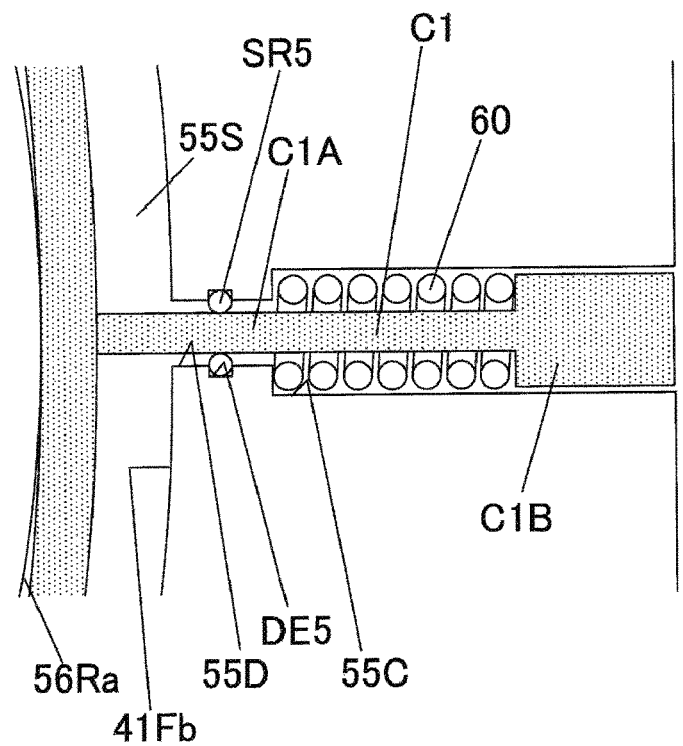

The compressed air for driving the sealing body is utilized to drive the mechanical stopper M1, but the mechanical stopper M1 may be driven only by spring force of the compression spring 60. FIG. 13B is a view of a variation 2B. Instead of removing a recessed portion C1D of the large-diameter portion C1B of the operation section C1 and a seal ring SR, a recessed portion DE5 is provided at a wall surface of the space 55D, and a seal ring SR5 is disposed in the recessed portion DE5. Driving is made only by the compression spring 60. However, the seal ring SR5 is fixed, and therefore, sealability at the operation section C1 can be improved.

Variation 3

In the above-described embodiment, upward driving of the sealing body 7 is performed using the air pressure, and downward driving of the sealing body 7 is performed using the compression spring 50 (see FIGS. 3A and 3B). However, the present invention is not limited to above.

For example, the problems of the vacuum valve 100 of the comparative example as described above might be caused even in the following vacuum valves A to E:

A. upward driving of a sealing body is performed using an electromagnet, and downward driving of the sealing body is performed using a compression spring;

B. upward driving of a sealing body is performed using an electromagnet, and downward driving of the sealing body is performed using a permanent magnet;

C. upward driving of a sealing body is performed using air pressure (the type of blocking the air pressure upon blackout), and downward driving of the sealing body is performed using air pressure (the type of supplying the air pressure even upon blackout);

D. upward driving of a sealing body is performed using air pressure (the type of blocking the air pressure upon blackout), and downward driving of the sealing body is performed using a permanent magnet; and E. upward driving of a sealing body is performed using air pressure (the type of blocking or discharging the air pressure upon blackout, a center close type), and downward driving of the sealing body is performed using air pressure (the type of supplying the air pressure even upon blackout). The present invention is applied to the above-described vacuum valves A to E so that the above-described problems can be solved.

The present invention is not limited to the contents described above. Other aspects conceivable within the scope of the technical idea of the present invention are also included in the scope of the present invention.

What is claimed is:

1. A vacuum valve comprising:
a housing configured such that a flow path of gas passing through a pair of opposing openings is formed;
a valve body detachably inserted into the flow path to control an opening area of the flow path;
a sealing body configured to movably push the valve body when the flow path is blocked by the valve body;
a sealing body drive section configured to drive the sealing body in upstream and downstream directions of the gas; and
a mechanical stopper including a restriction section configured to inhibit, at a restriction position, movement of the sealing body in the gas downstream direction,
wherein the mechanical stopper is disposed movable to a selected one of a first position at which movement of the sealing body toward a gas downstream side is inhibited at the restriction position or a second position at which movement of the sealing body from the restriction position to a non-restriction position on the gas downstream side is allowed.

2. The vacuum valve according to claim 1, wherein the sealing body includes
a seal ring contacting the valve body, and
a main body to which the seal ring is attached, and
the non-restriction position of the sealing body is a position at which the seal ring is detachable from the main body.

3. The vacuum valve according to claim 1, wherein the housing includes
a housing base portion provided with the pair of openings, and
a bonnet detachably provided at the housing base portion, and
a stopper operation mechanism configured to move, in association with attachment/detachment of the bonnet, the mechanical stopper between the first position and the second position is further provided.

4. The vacuum valve according to claim 3, wherein the stopper operation mechanism
is pushed by the bonnet to move the mechanical stopper to the first position when the bonnet is attached to the housing, and
uses pressure of compressed air to move the mechanical stopper to the second position when the bonnet is detached from the housing.

5. The vacuum valve according to claim 4, wherein the sealing body drive section further includes
a compression spring configured to bias the sealing body in the gas downstream direction, and
a pressure receiving portion configured to push back the sealing body in the gas upstream direction against biasing force of the compression spring by the pressure of the compressed air, and
a passage is provided, the passage allowing communication between an air pressure introduction chamber in which the compressed air acts on the stopper operation mechanism and an air pressure introduction chamber in which the compressed air acts on the pressure receiving portion.

6. The vacuum valve according to claim 5, wherein the sealing body and the mechanical stopper are annular bodies surrounding the flow path,
the sealing body includes
a cylindrical portion surrounding the flow path, and
an annular flange portion extending in an outer circumferential direction on one end side of the cylindrical portion,
the flange portion forms the pressure receiving portion, and
the restriction section of the mechanical stopper is provided on an opposite side of the stopper operation mechanism, and contacts the pressure receiving portion to restrict the sealing body at the restriction position.

7. The vacuum valve according to claim 4, wherein the mechanical stopper is provided to move in a plane perpendicular to the flow path.

* * * * *